(12) United States Patent
White

(10) Patent No.: US 6,380,703 B1
(45) Date of Patent: Apr. 30, 2002

(54) DIGITAL PLL FILTER AND VCO FOR USE IN CONTROLLING A SPINDLE MOTOR OF A MASS DATA STORAGE DEVICE

(75) Inventor: Bertram J. White, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/681,308

(22) Filed: Mar. 15, 2001

(51) Int. Cl.$^7$ ................................................. H02P 1/18
(52) U.S. Cl. ...................... 318/254; 318/439; 318/138; 318/459; 318/500; 388/928.1
(58) Field of Search ................................. 388/254, 138, 388/439, 459, 500, 928.1

(56) References Cited

U.S. PATENT DOCUMENTS

| | | | | |
|---|---|---|---|---|
| 4,900,993 A | * | 2/1990 | Yasohara et al. | 318/254 |
| 4,928,043 A | * | 5/1990 | Plunkett | 318/254 |
| 4,958,948 A | * | 9/1990 | Seima et al. | 388/812 |
| 5,543,697 A | | 8/1996 | Carobolante et al. | |
| 5,672,948 A | * | 9/1997 | Cohen et al. | 318/603 |
| 5,990,656 A | * | 11/1999 | Kardash | 318/807 |
| 6,252,362 B1 | * | 6/2001 | White et al. | 318/254 |

* cited by examiner

*Primary Examiner*—Robert E. Nappi
*Assistant Examiner*—Rina I. Duda
(74) *Attorney, Agent, or Firm*—W. Daniel Swayze, Jr.; W. James Brady; Frederick J. Telecky, Jr.

(57) ABSTRACT

A circuit for providing commutation control signals to a commutator for a polyphase brushless dc motor in a mass data storage device includes an accumulator (48) to accumulate a digital count that is proportional or related to a phase difference between the commutation control signals and a motor bemf. A digital variable frequency oscillator (52) generates an oscillator output signal of frequency proportional to the digital count to reset the accumulator (68) after a predetermined time determined by the frequency. The circuit may also include a digital filter (50) between the digital accumulator (48) and the digital variable frequency oscillator (52) to generate a magnitude signal (DRC) of magnitude proportional to the accumulated count for delivery to the variable frequency oscillator (52) to control the frequency thereof.

26 Claims, 5 Drawing Sheets

DIGITAL PLL FILTER AND VCO FOR USE IN CONTROLLING A SPINDLE MOTOR OF A MASS DATA STORAGE DEVICE

BACKGROUND OF INVENTION

1. Field of Invention

This invention relates to improvements in methods and circuits for driving DC brushless, polyphase motors, such as a spindle motor of a mass data storage device, or the like, and more particularly to improvements in such driving methods and circuits that at least reduce the acoustic noise in motors of this type, and to improvements in driving methods and circuits for driving such motors using digital circuitry for controlling the phase of the driving voltages to the spindle motor.

2. Relevant Background

This invention relates primarily to improvements in circuitry for use in controlling the spindle motor of mass data storage devices. Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Many applications are still being developed. Applications for hard disk drives are increasing in number, and are expected to further increase in the future. Mass data storage devices may also include optical disks in which the optical properties of a spinning disk are locally varied to provide a reflectivity gradient that can be detected by a laser transducer head, or the like. Optical disks may be used, for example, to contain data, music, or other information.

Typically, mass data storage devices use polyphase, usually three-phase, DC motors to rotate the memory media. In the operation of such DC brushless, polyphase motors of the type to which the invention pertains, efficient motor drive requires that the excitation current applied to the motor phases be aligned with the bemf generated by individual phases. One of the best schemes for achieving this alignment is the use of a phase-locked loop (PLL), which adjusts the phase and frequency of the commutation, so that the bemf of the undriven winding passes through zero in the center of the appropriate commutation state. If there is a significant phase error, torque ripple occurs which results in an unevenness or jerkiness in the motor rotation, and which may also excite resonances in the motor causing undesirable acoustic noise.

To address this problem in the past, care has been taken to assure that a pure sine wave shaped excitation signal is applied to the motor. To provide for such sinusoidal waveforms, various segmented and concatenated waveforms have been proposed in the past. Nevertheless, it is still greatly desirable to reduce as much as possible the phase error of the driving signals.

Consequently, what is needed is a disk drive and method for operating it in which the noise associated with the drive in operation is reduced or eliminated. What is additionally needed is a disk drive and method that controls the drive signals in a way that the phase error thereof is minimized.

SUMMARY OF INVENTION

In light of the above, therefore, it is an object of the invention to provide an improved disk drive and method for operating it in which the noise associated with the drive in operation is reduced or eliminated.

It is another object of the invention to provide a method and circuit for controlling the phase error of a polyphase dc motor.

It is another object of the invention to provide a mass data storage device containing the circuit for controlling the phase error of a polyphase dc motor.

These and other objects, features, and advantages will become apparent to those skilled in the art, when the following detailed description is read in conjunction with the accompanying drawings and appended claims.

According to a broad aspect of the invention, a circuit is presented for providing commutation control signals to a commutator for a polyphase brushless dc motor in a mass data storage device. The circuit includes an accumulator to accumulate a digital count that is proportional or related to a phase difference between the commutation control signals and a motor bemf; and a digital variable frequency oscillator to generate an oscillator output signal of frequency proportional or related to the digital count to reset the accumulator after a predetermined time determined by the frequency. The circuit may also include a digital filter between the digital accumulator and the digital variable frequency oscillator to generate a magnitude signal of magnitude proportional or related to the count for delivery to the variable frequency oscillator to control the frequency thereof.

According to another broad aspect of the invention, a circuit is presented for providing commutation control signals to commutator for a polyphase brushless dc motor in a mass data storage device. The circuit includes means for accumulating a digital count that is proportional or related to a phase difference between the commutation control signals and a motor bemf; and means for generating an oscillator output signal of frequency proportional or related to the phase difference to reset the means for accumulating after a predetermined time determined by the frequency. Means for digitally filtering the output signal may be provided to generate a magnitude signal of magnitude proportional or related to the count for delivery to the means for generating an oscillator output signal to control the frequency thereof.

According to still another broad aspect of the invention, a method is presented for providing commutation control signals to a commutator for a polyphase brushless dc motor in a mass data storage device. The method includes accumulating a digital count that is proportional or related to a phase difference between the commutation control signals and a motor bemf; and generating an oscillator output signal of frequency proportional or related to the digital count to reset the accumulator after a predetermined time determined by the frequency.

According to yet another broad aspect of the invention, a method is presented for controlling a commutation timing of a polyphase dc motor. The method includes accumulating a digital count representing a difference between a bemf voltage of the motor and a reference signal, using the accumulated digital count to generate a digital feedback word for accumulation during a subsequent accumulation window with a previously accumulated value; and using the accumulated digital count to also control a frequency of a periodically reoccurring reference signal to provide the reference signal, to determine the accumulation window, and to control the commutation timing.

According to still another broad aspect of the invention, a method is presented for controlling a commutation timing of a polyphase dc motor. The method includes determining if a phase detection window has begun. If a phase detection window has begun, a register is loaded with a first increment value. Thereafter, the method includes determining if the phase detection window has ended. If the phase detection window has not ended, an increment value is continually added to an accumulation register. If the phase detection window has ended, a value in the accumulation register is integrated in an integrating accumulator and stored in a register to establish a reference frequency and to establish when the phase detection window has begun and ended.

According to still yet another broad aspect of the invention, a mass data storage device is presented. The mass data storage device includes a circuit for providing commutation control signals to a commutator for a polyphase brushless dc motor in a mass data storage device. The circuit includes an accumulator to accumulate a digital count that is proportional or related to a phase difference between the commutation control signals and a motor bemf; and a digital variable frequency oscillator to generate an oscillator output signal of frequency proportional or related to the digital count to reset the accumulator after a predetermined time determined by the frequency. The circuit may also include a digital filter between the digital accumulator and the digital variable frequency oscillator to generate a magnitude signal of magnitude proportional or related to the count for delivery to the variable frequency oscillator to control the frequency thereof.

BRIEF DESCRIPTION OF DRAWINGS

The invention is illustrated in the accompanying drawings, in which.

In the various figures of the drawing, like reference numerals are used to denote like or similar parts.

DETAILED DESCRIPTION

Figure 1:
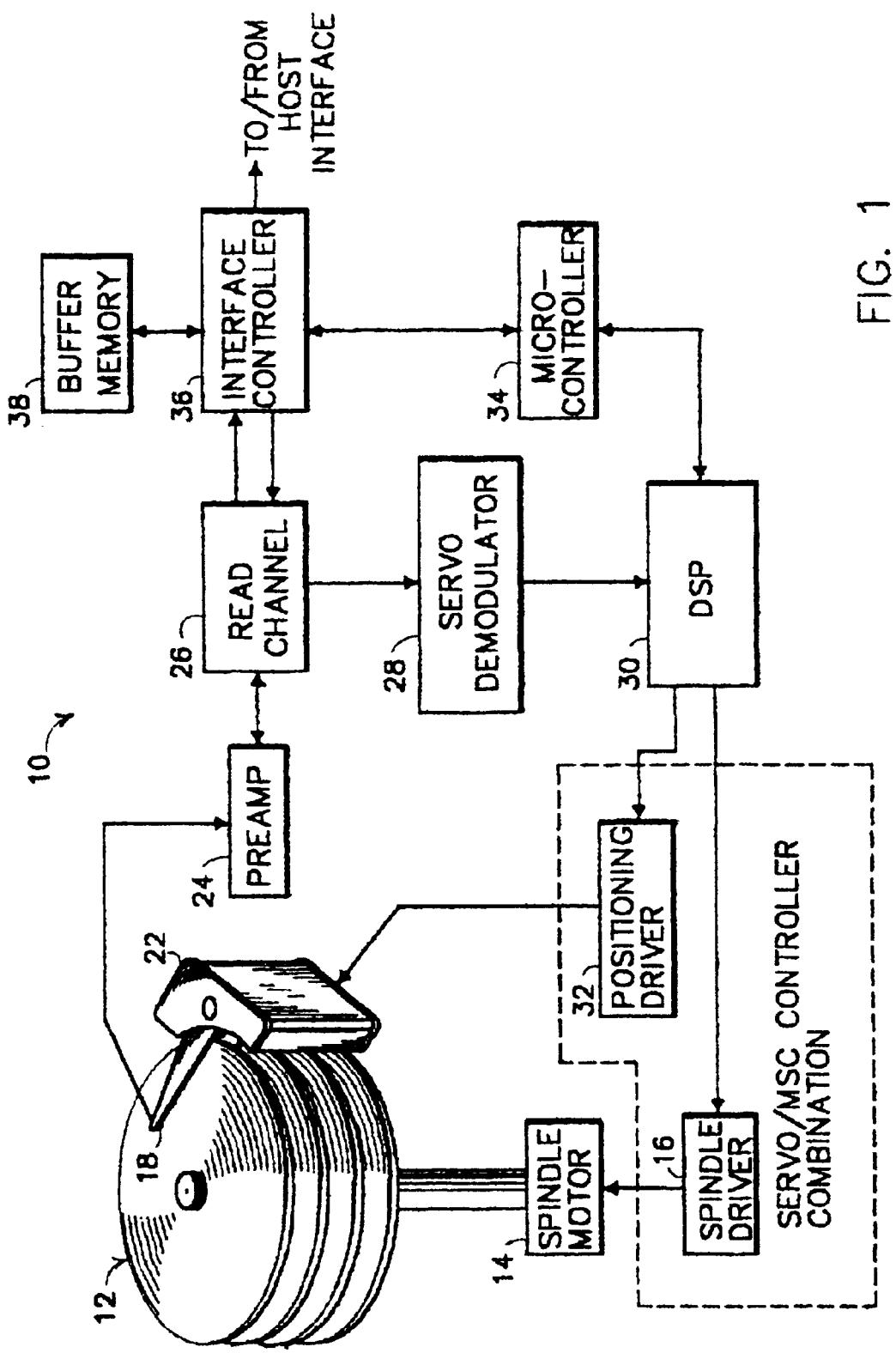
FIG. 1 is a block diagram of a generic disk drive system, illustrating the general environment in which the invention may be practiced.

FIG. 1 is a block diagram of a generic disk drive system 10, which represents the general environment in which the invention may be practiced. The system includes a magnetic media disk 12 that is rotated by a spindle motor 14 and spindle driver circuit 16. A data transducer or head 18 is locatable along selectable radial tracks (not shown) of the disk 12 by a voice coil motor 22. The radial tracks may contain magnetic states that contain information about the tracks, such as track identification data, location information, synchronization data, as well as user data, and so forth. The head 18 is used both to record user data to and read user data back from the disk, as well as to detect signals that identify the tracks and sectors at which data is written, and to detect servo bursts that enable the head to be properly laterally aligned with the tracks of the disk, as below described. Analog electrical signals that are generated by the head 18 in response to the magnetic signals recorded on the disk are preamplified by a preamplifier 24 for delivery to read channel circuitry 26. Servo signals are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP 30 for positioning the head 18. A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12.

Figure 2:
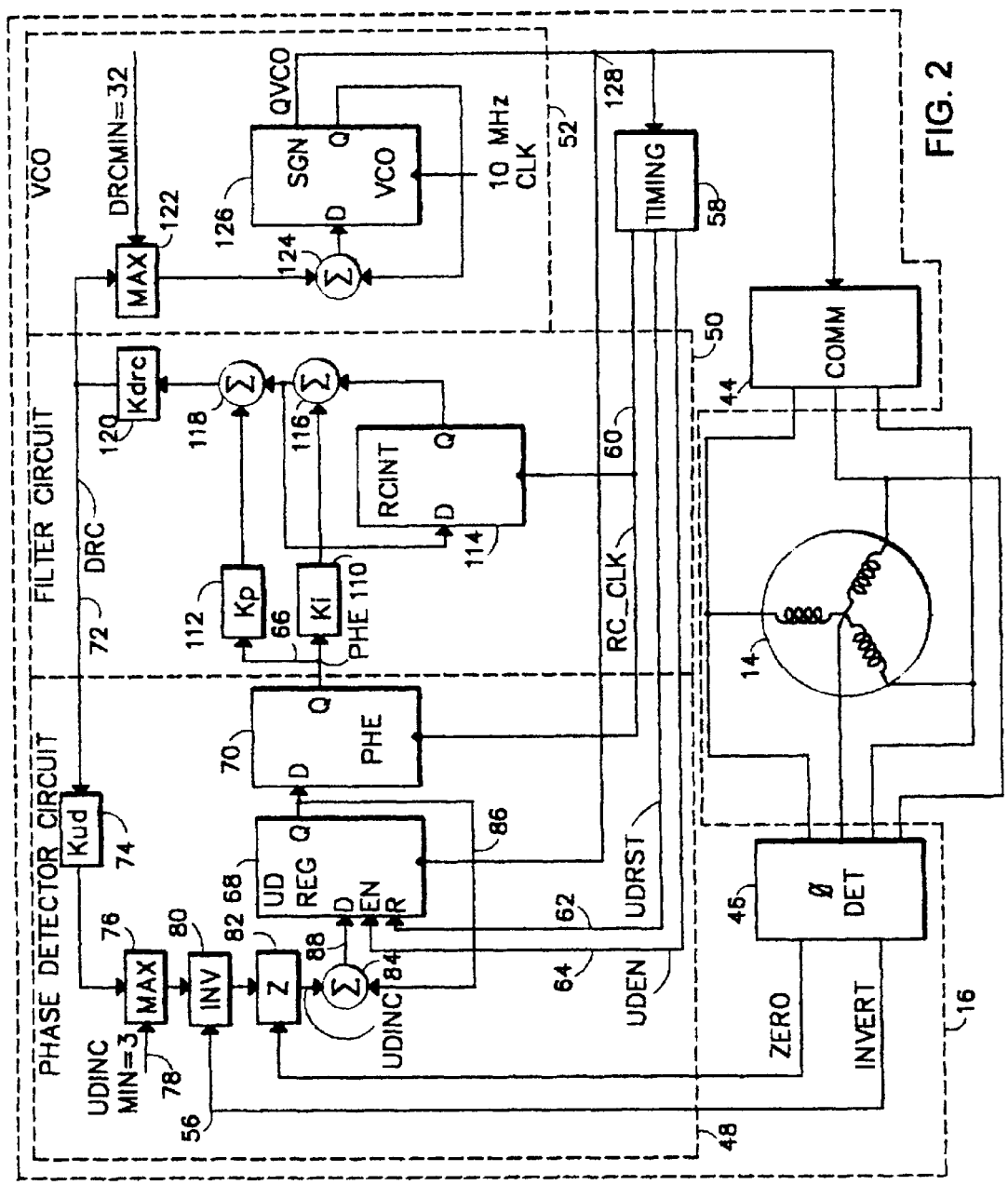
FIG. 2 is a block diagram/signal flow graph showing the operation of the digital phase detector, filter, and VCO to provide motor drive currents to a polyphase motor, according to a preferred embodiment of the invention.

Details of the spindle motor driver circuit 16 are shown in the box diagram, or "signal flow graph" of FIG. 2, to which reference is now additionally made. Drive signals to a commutator circuit 42 are provided by a VCO section 44 of the circuit 16, and a phase detection of the voltages applied to the motor 14 are detected in a phase detector circuit 46, both in a similar manner as in prior art circuits. However, the circuit 16 includes a phase detector circuit 48, a filter circuit 50 and an oscillator, or "voltage controlled oscillator" (VCO) 52, which, according to a preferred embodiment of the invention, are digital circuits, in contradistinction to the analog circuits previously used for these purposes.

The phase detector circuit 48 takes its inputs from the phase detector 46 and from a timing circuit 58. More particularly, the "zero" and "invert" signals from the phase detector 46 are delivered on respective lines 54 and 56 to the input of a phase detector circuit 48. In addition, the timing circuit 58 provides clock signals (RC_CLK) on line 60, a reset signal (UDRST) on line 62 and an enable signal (UDEN) on line 64 as inputs to the phase detector circuit 48. The relative timing of the various signals RC_CLK, UDEN, and UDRST are below described in detail.

In operation, the phase detector circuit 48 calculates a phase error signal (PHE) on line 66, and adjusts the frequency of the output of the VCO circuit 52 upward or downward, according to this phase error. The phase detector circuit 48 determines the phase error by accumulating a value during a window that is established by the timing circuit 58, and includes an up/down register 68 that provides an accumulated phase error value to a phase-error latch circuit 70, the output of which controls the frequency of the VCO circuit 52. The up/down register is referred to herein as the phase-error accumulator register. As will become apparent, the phase error value is used to determine a control signal DRC on line 72, which is actually used to control the frequency of the VCO circuit 52, as well as to provide a signal to be accumulated in the phase-error accumulator register 68, which may be, for example, in a hardware implementation, a series of D-type flip-flops.

Thus, the DRC signal on line 72 is weighted, if desired, in a weighting circuit 74, and is passed through a maximum value circuit 76. The maximum value circuit provides a lower limit to the value of DRC that is allowed to pass, as well as establishing a minimum value (UDINCMIN), such as 3 in the embodiment shown. The minimum value of UDINCMIN in provided as a programmable input on line 78 to the maximum value circuit 76.

The output from the maximum value circuit 76 is applied to an invert circuit 80 and a zero value circuit 82 to provide an increment value that is summed by a summer 84 with the output from the phase-error accumulator register 68 on line 86. The summed value is then inputted to the phase-error accumulator register 68 on line 88, and registered therein. The phase-error accumulator register 68 is clocked by the output of the VCO.

Figure 3:
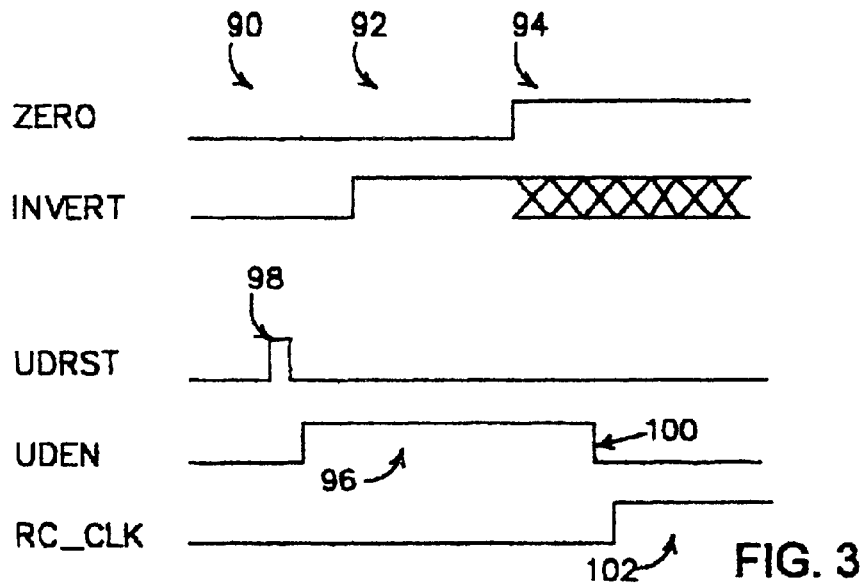
FIG. 3 is a series of waveforms that are inputted to the circuit of FIG. 2, showing the various modes of operation of the accumulating register thereof, according to a preferred embodiment of the invention.

Still more particularly, the operation of the phase-error accumulator register 68 is determined by the values of the various input signals INVERT, ZERO, UDRST, UDEN, and RC_CLK, as shown in FIG. 3, to which reference is now additionally made. The phase detector controls the INVERT and ZERO signals, depending upon the phase of the signals detected between the floating coil of the motor 14 and the center tap thereof. When ZERO is low and INVERT is low, as denoted by reference numeral 90, a positive phase error will accumulate in the phase-error accumulator register 68. When ZERO is low and INVERT is high, as shown by reference numeral 92, a negative phase error will accumulate in the phase-error accumulator register 68. During times when ZERO is high, as denoted by reference numeral 94, no error will be accumulated in the phase-error accumulator register 68.

Additionally, the phase detector circuit 48 builds up a count that represents the phase error in the phase-error accumulator register 68 during a time interval defined by UDEN being high 96. Just before UDEN rises, UDRST changes state 98 to clear the phase-error accumulator register 68 to enable it to begin a fresh count. Once the phase error has been determined and accumulated in the phase-error accumulator register 68, the accumulated value is latched by the signal RC_CLK 102 in the phase-error latch circuit 70 to become the current phase error. The phase-error latch circuit 70 also may be, for example, in a hardware implementation, a series of D-type flip-flops. Thus, the amplitude of the error accumulated on each VCO clock edge is proportional or related to DRC, is developed by the filter circuit 50 to provide the input to the VCO circuit 52.

The filter circuit 50 calculates a proportional and integral error and updates DRC. The update rate of the filter circuit 50 is controlled by the RC_CLK signal on line 60, which rises shortly after the phase error has been accumulated in UD, as shown by signal 102 in FIG. 3. The filter circuit 50 weights the phase error signal from the phase-error latch circuit 70 in weighting circuits 110 and 112, with weighting factors Ki and Kp, respectively. Ki controls the integral gain of the filter integrator circuit 114, and Kp provides a proportionality gain of the output in establishing DRC. The Ki and Kp constants may be user programmable, if desired, and typical values are given below. It is desirable to provide user programmability of these values to permit the user to tailor the step response of the PLL to his needs. In general, a high bandwidth PLL will have more phase jitter but be will respond more quickly to a phase error. A low bandwidth PLL will take longer to respond, but will have less phase jitter.

The output of weighting circuit 110 is summed with the output of the filter integrator circuit 114 in a summer 116. The filter integrator circuit 114 may be, for example, in a hardware implementation, a series of D-type flip-flops. The output of the weighting circuit 112 is also summed with the output of the summer 116 in a summer 118, which is weighted in a third weighting circuit 120 to provide the signal DRC to line 72. Typically, the weighting factor, Kdrc, in weighting circuit 120 would not be user adjustable. The signal DRC, as mentioned above, is supplied back to the phase detector circuit 48 and to the VCO circuit 52.

The VCO is an "accumulator style" circuit, which also may be, for example, in a hardware implementation, a series of D-type flip-flops that output an average frequency proportional or related to the DRC signal on line 72. The DRC signal is weighted in a weighting circuit 122, and is summed in a summer 124 with the output of the VCO circuit 126. The VCO circuit 126 is clocked by a system clock signal, which may be, for example, on the order of 10 MHz. The output of the VCO circuit 126 is the sign bit of the accumulator on line 128, which controls the commutator circuit 44. This signal is:

$$F_{VCO} = \frac{DRC \times F_{clk}}{2^N}$$

It can be seen that the behavior of the circuit is determined by the constants UDINCMIN, Kud, Kp, Ki, Kdrc, and DRCMIN. For example, if the word in the phase-error accumulator register 68 is 15 bits long, the word in the phase-error latch circuit 70 may be 12 bit long, least significant bit (LSB) adjusted to the word in the phase-error accumulator register 68. Preferably, roll over of the phase-error latch circuit 70 is not allowed; however, the register may be saturated and sign extended if necessary. The word contained in the filter integrator circuit 114 may be a 16 bit unsigned word, least significant bit (LSB) adjusted to the word in the filter integrator circuit 114. Again, preferably roll over of the filter integrator circuit 114 is not allowed; however, the register may be saturated and sign extended if necessary.

The length of DRC on line 72 may be the upper 12 bits of the filtered phase error signal, PHE, on line 66, and the word length in the VCO circuit 126 may be 13 bits, with the sign bit providing the output (QVCO) on line 128.

The coefficients Kud, Kdrc, Kp, and Ki may be fixed in hardware in a preferred embodiment; however, Kp and Ki may be user adjustable, if desired to optimize the tradeoff between VCO slew rate and VCO jitter. In practice, the user may use one value of Kp and Ki during motor start and another during motor run. With the word lengths as described above, typical values for these constants may be as follows:UDINCMIN=3; DRCMIN=32; Kud=1/64; Kdrc=1/16; Kp=1; Ki=1/8. Although the invention has been described above with reference to FIG. 2 with respect to a hardware implementation, it will be appreciated that many of the functions performed by the hardware may be performed in a suitably programmed digital signal processor (DSP). More particularly, many of the functions can be performed in the DSP 30 associated with the mass data storage device 10, as shown, for example, in the block diagram of FIG. 4, to which reference is now additionally made.

As can be seen, the functions of the phase detector circuit 48 and the filter circuit 60 have been incorporated into the DSP 30, to provide the output signal DRC to the VCO 52. If desired, the functions of the VCO circuit may also be incorporated into the DSP 30.

Figure 4:
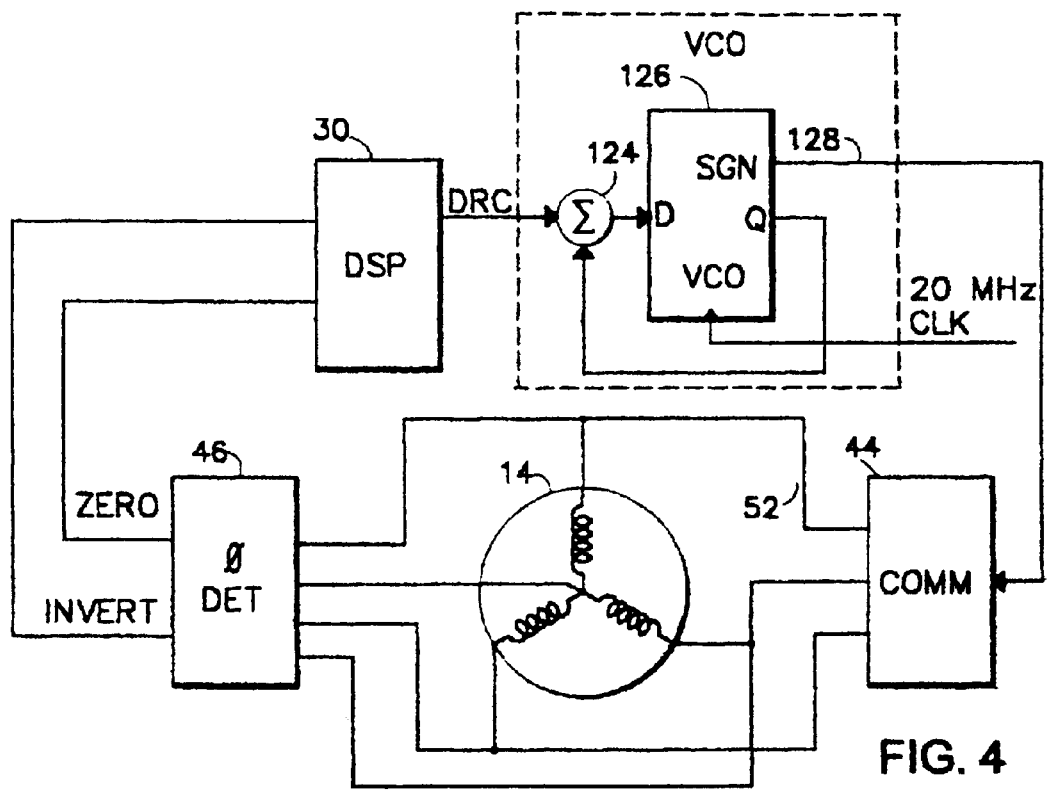
FIG. 4 is a block diagram of another preferred embodiment of the invention, in which at least some of the functions performed by the hardware circuit of FIG. 2 are performed in a digital signal processor.
Figure 5:
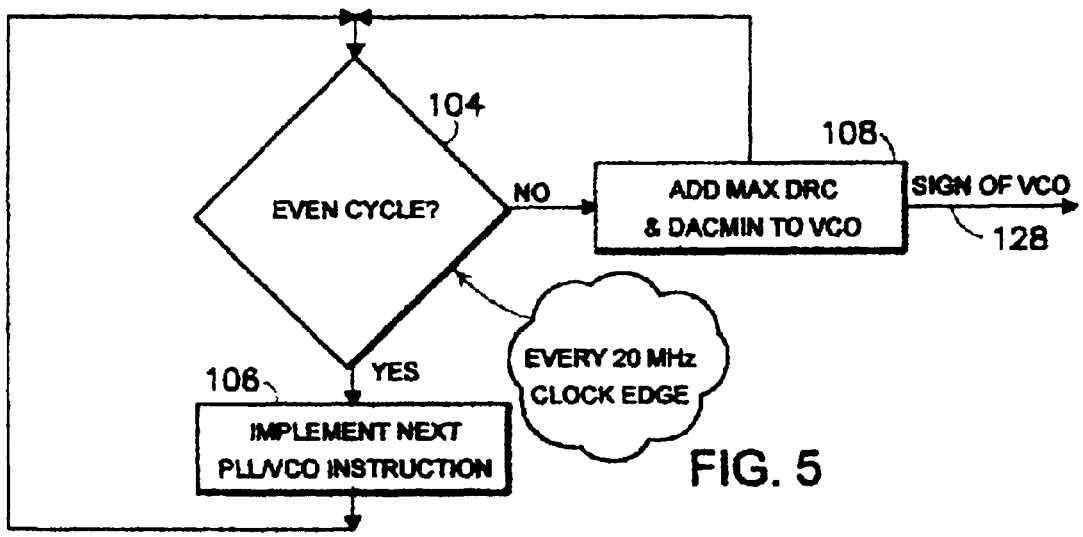
FIG. 5 is a flow chart showing how the timing signal for delivery to the commutation circuit is developed in the digital signal processor of FIG. 4.

FIG. 5 shows a flow chart of a program that may be used in the DSP 30 of FIG. 4, showing how the timing signal for delivery to the commutation circuit is developed by the DSP 30. Typically, a 20 MHz clock signal is provided, although it is not intended to limit the operation of the circuits herein to such frequency. The VCO 126 operates on the rising clock edge of every other clock pulse. Thus, the first step in the process is to determine if the received clock edge is an even clock edge 104. If the clock is an even cycle, the next PLL/VCO instruction is implemented 106, and the clock cycles are continued to be monitored 104. If the clock is not an even cycle, the maximum DRC and DACMIN values are added to the VCO 108. The sign bit of the VCO value is outputted on the line 128 (QVCO), and the clock cycles are continued to be monitored 104.

Figure 6:
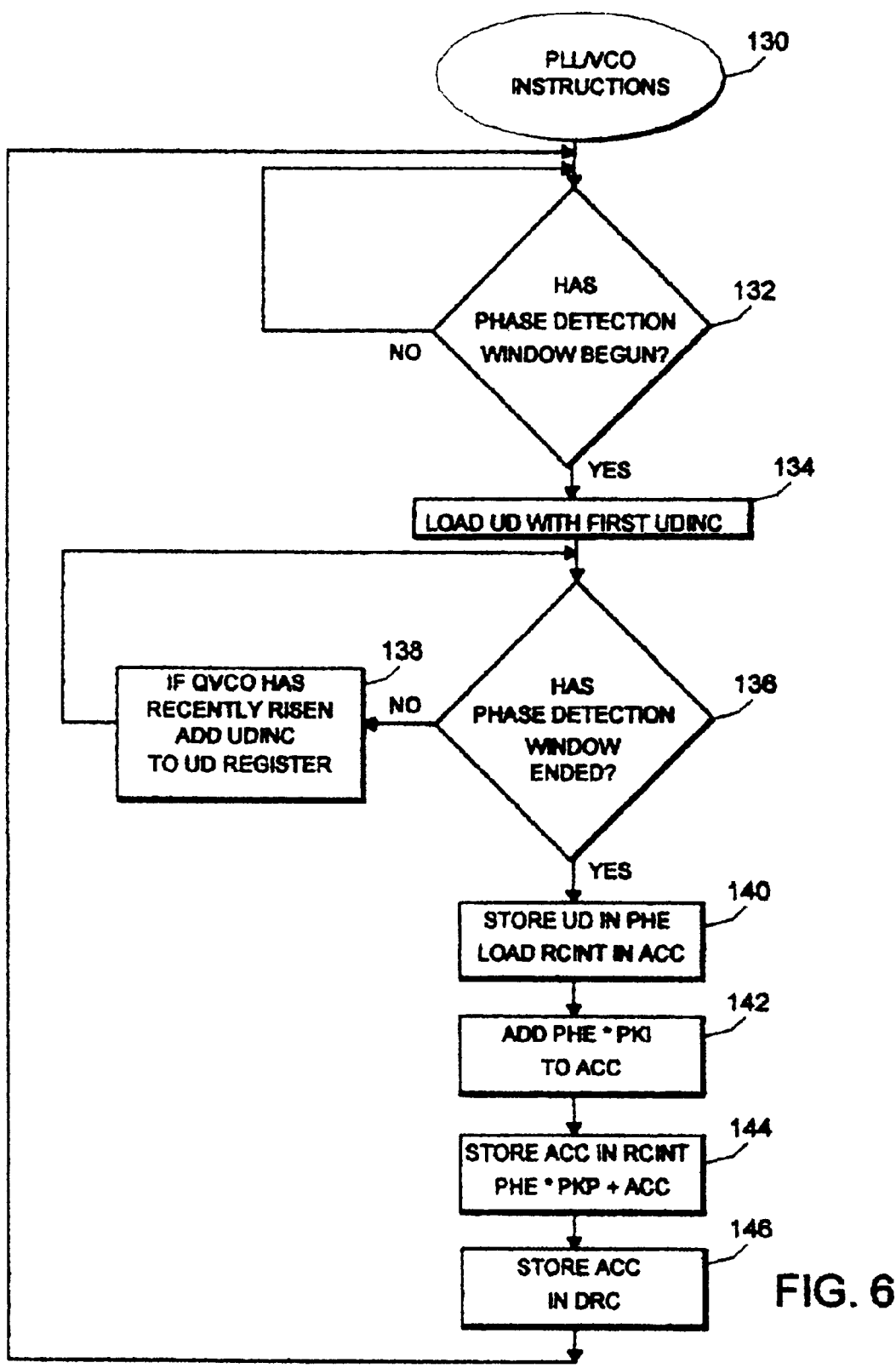
FIG. 6 is a flow chart showing how the DRC signal is developed for use in the process of the flow chart of FIG. 5.

FIG. 6 is a flow chart showing how the DSP 30 may be programmed to develop the DRC signal. Each time a PLL/VCO instruction is implemented, as shown in box 106 of FIG. 5, the loop 130 runs. The first decision 132 is to determine whether a phase detection window has begun. If not, the process loops and continues. If the phase detection window has begun, which corresponds to the occurrence of UDRST and UDEN in the hardware embodiment described above, then the first UDINC is loaded into the UD register 134. A determination is then made 136 whether a phase detection window has ended. If not, then an incrementing value UDINC is added to the contents of the UD register 138 if QVCO 128 has recently risen. During the passes through block 136 while awaiting the end of the phase detection window, the phase error value is accumulated. This may take, for example 64 increments for each PWM cycle. The number of PWM cycles contained in the phase detection window may vary from application to application, for instance between 1 and 4. The user may be allowed to program values corresponding to the values Ki 110 and Kp 112 in the hardware implementation above to define the loop gain of the PLL. These values, referred to herein as PKI and PKP, will be multiplied by the accumulated phase error value for processing, as below described. As mentioned, the clock frequency used for the accumulation is QVCO in the embodiment illustrated.

If a phase detection window has ended, corresponding to the occurrence of RC_CLK in the hardware embodiment above, the contents of the UD register, which represents the accumulated phase error, are stored in a phase error register 140, in preparation for storage in an accumulator register of the DSP. The accumulated phase error value stored in the phase error register is then multiplied by the PKI multiplier, described above, and added to the value in the filter register. This corresponds to the provision of user programmability to adjust the step response of the PLL to his needs.

The multiplied value of the accumulated phase error and PWM weighting factor PKI are then stored in an integrating circuit register or accumulator 142 in the DSP. This value is further weighted with a value, PKP, corresponding to the weight provided in the hardware embodiment described above by factor Kp 112 in FIG. 2, and the new value stored 144 in the accumulator 142. The updated value is then stored in a register as a DRC value 146, for use in controlling the frequency of the VCO.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit for providing commutation control signals to a commutator for a polyphase brushless dc motor in a mass data storage device, comprising:
   an accumulator to accumulate a digital count that is related to a phase difference between said commutation control signals and a motor bemf; and
   a digital variable frequency oscillator to generate an oscillator output signal of frequency related to said digital count to reset said accumulator after a predetermined time determined by said frequency.

2. The circuit of claim 1 further comprising a digital filter between said digital accumulator and said digital variable frequency oscillator to generate a magnitude signal of magnitude related to said count for delivery to said variable frequency oscillator to control the frequency thereof.

3. The circuit of claim 2 wherein said output signal of said variable frequency oscillator is a sign of a signal generated by said variable frequency oscillator.

4. The circuit of claim 3 wherein said variable frequency oscillator is an accumulator that accumulates a count related to said magnitude signal.

5. The circuit of claim 1 further comprising a first feedback circuit to feedback an accumulated digital count signal to said accumulator to additively increase a count in said accumulator in dependence upon said accumulated digital count.

6. The circuit of claim 5 further comprising an inverter circuit to control a sign of accumulated digital count signal fed back to said accumulator in accordance with a direction of said phase difference between said commutation control signals and a motor bemf.

7. The circuit of claim 2 further comprising circuits for weighting said digital count and said magnitude signal.

8. The circuit of claim 7 wherein at least one of said circuits for weighting said digital count and said magnitude signal is user programmable.

9. A circuit for providing commutation control signals to a commutator for a polyphase brushless dc motor in a mass data storage device, comprising:
   means for accumulating a digital count that is related to a phase difference between said commutation control signals and a motor bemf; and
   means for generating an oscillator output signal of frequency related to said phase difference to reset said means for accumulating after a predetermined time determined by said frequency.

10. The circuit of claim 9 further comprising means for digitally filtering the accumulated digital count to generate a magnitude signal of magnitude related to said count for delivery to said means for generating an oscillator output signal to control the frequency thereof.

11. The circuit of claim 10 wherein said output signal of said means for generating an oscillator output signal is a sign of a signal generated by said means for generating an oscillator output signal.

12. The circuit of claim 10 wherein said means for generating an oscillator output signal comprises means for accumulating a count related to said magnitude signal.

13. A method for providing commutation control signals to a commutator for a polyphase brushless dc motor in a mass data storage device, comprising:
   accumulating a digital count that is related to a phase difference between said commutation control signals and a motor bemf; and
   generating an oscillator output signal of frequency related to said digital count to reset said accumulator after a predetermined time determined by said frequency.

14. A method for controlling a commutation timing of a polyphase dc motor comprising:
   accumulating a digital count representing a difference between a bemf voltage of said motor and a reference signal;
   using said accumulated digital count to generate a digital feedback word for accumulation during a subsequent accumulation window with a previously accumulated value; and using said accumulated digital count to also control a frequency of a periodically reoccurring reference signal to provide said reference signal, to determine said accumulation window, and to control said commutation timing.

15. The method of claim 14 further comprising weighting said accumulated value in accordance with a number of pulse-width-modulated cycles existing in said accumulation window.

16. The method of claim 14 further comprising integrating said accumulated value to produce said digital feedback word.

17. A method for controlling a commutation timing of a polyphase dc motor comprising:
    determining if a phase detection window has begun; if a phase detection window has begun, loading a register with a first increment value;
    determining if the phase detection window has ended; if the phase detection window has not ended, continuing to add an increment value to an accumulation register;
    if the phase detection window has ended, integrating a value in the accumulation register in an integrating accumulator;
    and storing the integrated value in a register, said integrated value establishing a reference frequency and establishing when said phase detection window has begun and ended.

18. The method of claim 17 further comprising weighting said accumulated value in accordance with a number of pulse-width-modulated cycles existing in said accumulation window.

19. A mass data storage device, comprising:
    a circuit for providing commutation control signals to a commutator for a polyphase brushless dc motor in a mass data storage device, said circuit including:
    an accumulator to accumulate a digital count that is related to a phase difference between said commutation control signals and a motor bemf; and
    a digital variable frequency oscillator to generate an oscillator output signal of frequency related to said digital count to reset said accumulator after a predetermined time determined by said frequency.

20. The mass data storage device of claim 19 further comprising a digital filter between said digital accumulator and said digital variable frequency oscillator to generate a magnitude signal of magnitude related to said count for delivery to said variable frequency oscillator to control the frequency thereof.

21. The mass data storage device of claim 20 wherein said output signal of said variable frequency oscillator is a sign of a signal generated by said variable frequency oscillator.

22. The mass data storage device of claim 21 wherein said variable frequency oscillator is an accumulator that accumulates a count related to said magnitude signal.

23. The mass data storage device of claim 19 further comprising a first feedback circuit to feedback an accumulated digital count signal to said accumulator to additively increase a count in said accumulator in dependence upon said accumulated digital count.

24. The mass data storage device of claim 23 further comprising an inverter circuit to control a sign of accumulated digital count signal fed back to said accumulator in accordance with a direction of said phase difference between said commutation control signals and a motor bemf.

25. The mass data storage device of claim 20 further comprising circuits for weighting said digital count and said magnitude signal.

26. The mass data storage device of claim 25 wherein at least one of said circuits for weighting said digital count and said magnitude signal are user programmable.

* * * * *